United States Patent Office 3,409,443
Patented Nov. 5, 1968

3,409,443
EGG CUSTARD COMPOSITION AND PROCESS
Emery Polya, Tarrytown, and Julius Green, New City, N.Y., assignors to General Foods Corporation, White Plains, N.Y., a corporation of Delaware
No Drawing. Filed Sept. 7, 1965, Ser. No. 485,590
13 Claims. (Cl. 99—139)

ABSTRACT OF THE DISCLOSURE

A composition for making a custard by admixture with milk and egg, comprising an edible hydrocolloid (typically, Irish moss extracts, alginates and pectin), a compound furnishing a sequestering anion non-fat milk solids and egg yolk solids. The process of making the custard and the custard are also described.

---

This invention relates to a new and improved food composition, to a process of producing a smooth milk-egg custard employing the same, and to the custard so prepared.

Custard is usually prepared by combining eggs, milk and sugar in a container, setting the container having the blended ingredients therein into a shallow pan of water, then placing the container and pan in an oven and baking for approximately one hour. The egg and milk constituents coagulate and provide what is known as a "custard" having a characteristic easily fractured, short gel structure. In addition to effecting coagulation, the eggs also provide high nutritional food values.

Previously, attempts have been made to simulate the texture of conventionally prepared custard by combining a hydrocolloidal gum such as, for example, carrageenins, alginates, agaragar, pectin or gelatin, with milk and sugar, bringing the mixture to a boil and then permitting the mixture to set. However, such attempts have not been wholly successful in achieving the characteristic custard taste and texture because such preparations do not contain eggs. Furthermore, the nutritional value is much lower than that of conventional custard. Efforts have also been made to include eggs as an ingredient with such gum and milk systems. However, it has generally been found that incompatibility exists between the various hydrocolloids which might be employed and the eggs or that inferior textural qualities are apparent in the resulting product.

It is an object of the present invention to provide a new and improved food composition suitable for use in preparing a milk-egg custard.

A further object of the present invention is to provide a new and improved dry food composition which permits realization of all of the nutritional and textural advantages of conventionally prepared custard but with greater ease of preparation and lower cost.

An additional important object of the present invention is to provide a new and improved food composition suitable for preparing a milk-egg custard having a hydrocolloid as an ingredient but which ingredient is compatible with other ingredients in the food composition.

It has now been discovered that a smooth milk-egg custard can be produced by combining a hydrocolloid and a compound having a sequestering anion. By employing a compound having a sequestering anion in combination with such hydrocolloid, typically an Irish moss extract, alginate, pectin or the like, egg yolk or egg solids may be incorporated with such hydrocolloid and yet, incompatibility between the various ingredients is not found. The composition may be readily employed to produce a smooth milk-egg custard by admixing a hydrocolloid and a compound having a sequestering anion together with egg yolk or egg solids and milk, and also sugar, bringing the blend to a boil and then allowing the blend to set to a gel.

Thus, the present invention is based upon the surprising finding that certain additives, namely compounds having a sequestering anion, allow the addition of egg either in the form of fresh or dried yolk or dried egg solids to be incorporated with hydrocolloids, typically an Irish moss extract, alginate, pectin or the like, whereby intolerance or incompatibility which heretofore has been characteristic of milk-egg-gum systems is substantially eliminated.

The Irish moss extract which is employed in a preferred composition of the present invention is ordinarily a refined, hot water soluble extract of the raw moss. The Irish moss can be classified generally as sea plant geloses obtained from moss or seaweeds like *Chondrus crispus* and *Gigartina stellata* and other related members of the Gigartinaceae genus. The gelling agent of Irish moss extract is commonly known as carrageenan, and carrageenan is further understood to refer to a soluble salt or salt mixture of the polysaccharide sulphate complex which essentially constitutes the hydrocolloid extract from Irish moss.

Other hydrocolloids may be similarly employed. Thus, water soluble alkali metal alginates, for example, sodium alginate; pectin, for example, low methoxyl pectin; and the like are suitable.

The amount of hydrocolloid which is employed in the composition may be varied considerably to yield a custard-like consistency. An amount ranging from about 1 to 20%, basis the weight of egg yolk or dried egg solids is ordinarily sufficient. Most preferably, the amount of hydrocolloid employed is about 5%, basis the weight of egg yolk or dried egg solids.

It has been found that a wide variety of compounds having sequestering anions may be employed in combination with a hydrocolloidal gum to provide the novel composition of this invention. It appears that the presence of a sequestering anion is necessary to overcome incompatibility between such hydrocolloid and egg yolk or dried egg solids because of the ionic charges that are present on each of these ingredients. While we do not wish to be bound by any theoretical explanation, it seems that the compounds having sequestering anions forestall incompatibility until the milk-egg custard is set by combining with free cations which may be present in the hydrocolloid or the ions, presumably positively charged, that are present in egg yolk or egg solids. Among the compounds which may be employed are citrates, tartrates, adipates, maleates, fumarates, pyrophosphates, tripolyphosphates, metaphosphates and salts of ethylene diamine tetraacetic acid. Generally, the alkali metal and ammonium salts of these compounds are preferred. More advantageously, the sodium salts are employed inasmuch as potassium and ammonium salts have the tendency of producing too rapid a gel if Irish moss extract is employed. Of these, trisodium citrate and the sodium salt of ethylene diamine tetraacetic acid are found to be especially useful. The amount of compound having a sequestering anion may be varied over a considerable range depending upon the amount of egg yolk or dried egg solids and the amount of hydrocolloid employed. Preferably, the amount of such compound or mixtures of such compounds will be from about 0.5 to 25%, basis the weight of egg yolk or dried egg solids.

In addition to a hydrocolloid, typically an Irish moss extract, and a compound furnishing a sequestering anion, the composition of this invention may desirably contain dried egg yolk or dried egg solids, non-fat dried milk solids and sugar. Of course, other ingredients such as salt, flavor, color, etc. in minor amounts may be incorporated into the compositions which are packaged, distributed and sold as a dry-mix. Thus, the consumer merely admixes the composition with milk, brings the admixture to a boil and then allows the blend to set to a gel. The simplicity, convenience and ease of preparation as well as the reduced time for making a smooth egg-milk custard are thus apparent. Although it is not essential, if desired, the consumer may add fresh egg yolk at the time of admixing the composition with milk for added nutrition, flavor and color.

In order to further illustrate the present invention, the following non-limiting examples are furnished:

| | Example I | Example II | Example III |
|---|---|---|---|
| Weight in Grams: | | | |
| Sugar | 33.20 | 31.85 | 32.20 |
| Nonfat dry milk solids | 12.00 | 12.00 | 12.00 |
| Egg yolk solids | 10.00 | 10.00 | 10.00 |
| Salt | 0.60 | 0.60 | 0.60 |
| Color | 0.15 | 0.15 | 0.15 |
| Flavor | 0.15 | 0.15 | 0.15 |
| Calcium carrageenans | 0.65 | 0.65 | 0.65 |
| Trisodium citrate | | 1.35 | |
| Sodium salt of ethylene diamine tetraacetic acid | | | 1.00 |

The ingredients listed in Example I were added to 1½ cups milk, stirred, and brought to a full boil on stove top, then chilled 1 to 2 hours in dessert cups. There was visual evidence, when full boil was reached, of curdling and graininess. This was also confirmed in the chilled dessert, which showed discontinuous texture, grainy mouthfeel, and tendency to weep. The unmolded dessert also collapsed or lost mold height on standing.

The ingredients listed in Example II were given the same recipe treatment as for Example I. In contrast, however, the finished dessert was smooth in appearance and mouthfeel and had excellent mold stability.

The ingredients listed in Example III were given the same treatment as for Example I. Results similar to those obtained in Example II were obtained.

Moreover, when Example II was repeated adding 25 grams of fresh egg yolk before cook-up, finished product recipe performance was not affected. Yet when the same amount of fresh egg yolk was added before cook-up to the ingredients in Example I, curdling and graininess were aggravated, the poor texture, inferior mouthfeel and tendency to weep were more pronounced, and the unmolded dessert collapsed more rapidly.

EXAMPLES IV AND V

Examples I and II were repeated in all essential respects except that 2.5 grams of low methoxyl pectin (150 gel power) were substituted for the calcium carrageenans. The dessert of Example IV was similar to that obtained in Example I, both of which contained no sodium citrate. However, the dessert of Example V was of good, smooth, firm texture like that of Example II.

EXAMPLES VI AND VII

Examples I and II were repeated in all essential respects except that 3.0 grams of sodium alginate were substituted for the calcium carrageenans. The dessert of Example VI was similar to that obtained in Example I, both of which contained no sodium citrate. However, the dessert of Example VII was of good, smooth, firm texture like that of Example II.

While the present invention has been described in conjunction with various preferred embodiments, it is to be understood that it is not to be merely and so restricted thereto. It will be apparent that numerous modifications and advantages of the invention will be obvious and, therefore, no limitations should be set therein except insofar as they appear in the appended claims.

We claim:

1. A composition capable of forming a smooth milk-egg custard comprising an Irish moss extract, a compound furnishing a sequestering anion, non-fat dry milk solids and egg yolk solids.

2. A composition capable of forming a smooth milk-egg custard comprising an Irish moss extract, a compound furnishing a sequestering anion, non-fat dry milk solids, egg yolk solids, and sugar.

3. A composition as in claim 2 in which said compound furnishing a sequestering anion is selected from the group consisting of citrates, tartrates, adipates, maleates, fumarates, pyrophosphates, tripolyphosphates, metaphosphates and salts of ethylene diamine tetraacetic acid.

4. A composition as in claim 3 in which said compound is trisodium citrate.

5. A composition as in claim 3 in which said compound is a sodium salt of ethylene diamine tetraacetic acid.

6. A process of producing a milk-egg custard which comprises admixing an Irish moss extract, a compound furnishing a sequestering anion, egg yolk and milk, heating the admixture to a boil, and allowing the admixture to set to a gel.

7. A process as in claim 6 in which said compound is selected from the group consisting of citrates, tartrates, adipates, maleates, fumarates, pyrophosphates, tripolyphosphates, metaphosphates and salts of ethylene diamine tetraacetic acid.

8. A process as in claim 7 in which said compound is trisodium citrate.

9. A process as in claim 7 in which said compound is a sodium salt of ethylene diamine tetraacetic acid.

10. A smooth milk-egg custard having improved texture and excellent mold stability comprising an Irish moss extract, a compound furnishing a sequestering anion, egg yolk and milk.

11. A smooth milk-egg custard as in claim 10 in which said compound is selected from the group consisting of citrates, tartrates, adipates, maleates, fumarates, pyrophosphates, tripolyphosphates, metaphosphates and salts of ethylene diamine tetraacetic acid.

12. A smooth milk-egg custard as in claim 11 in which said compound is trisodium citrate and further comprising sugar.

13. A smooth milk-egg custard as in claim 11 in which said compound is a sodium salt of ethylene diamine tetraacetic acid and further comprising sugar.

References Cited

UNITED STATES PATENTS

| 2,701,767 | 2/1955 | Twieg et al. | 99—132 |
| 2,754,214 | 7/1965 | Leo et al. | 99—132 |
| 2,784,099 | 3/1957 | Block et al. | 99—139 |
| 2,801,923 | 8/1957 | Stolof | 99—131 X |
| 2,808,337 | 10/1957 | Gibesen | 99—131 |
| 2,864,706 | 12/1958 | Stolof | 99—131 |
| 2,910,366 | 10/1959 | Leo et al. | 99—139 |
| 2,992,113 | 7/1961 | Gorman et al. | 99—139 |

OTHER REFERENCES

Whistler et al.: "Industrial Gums," 1959 Academic Press, New York, pages 96 and 110.

A. LOUIS MONACELL, *Primary Examiner.*

J. M. HUNTER, *Assistant Examiner.*